UNITED STATES PATENT OFFICE.

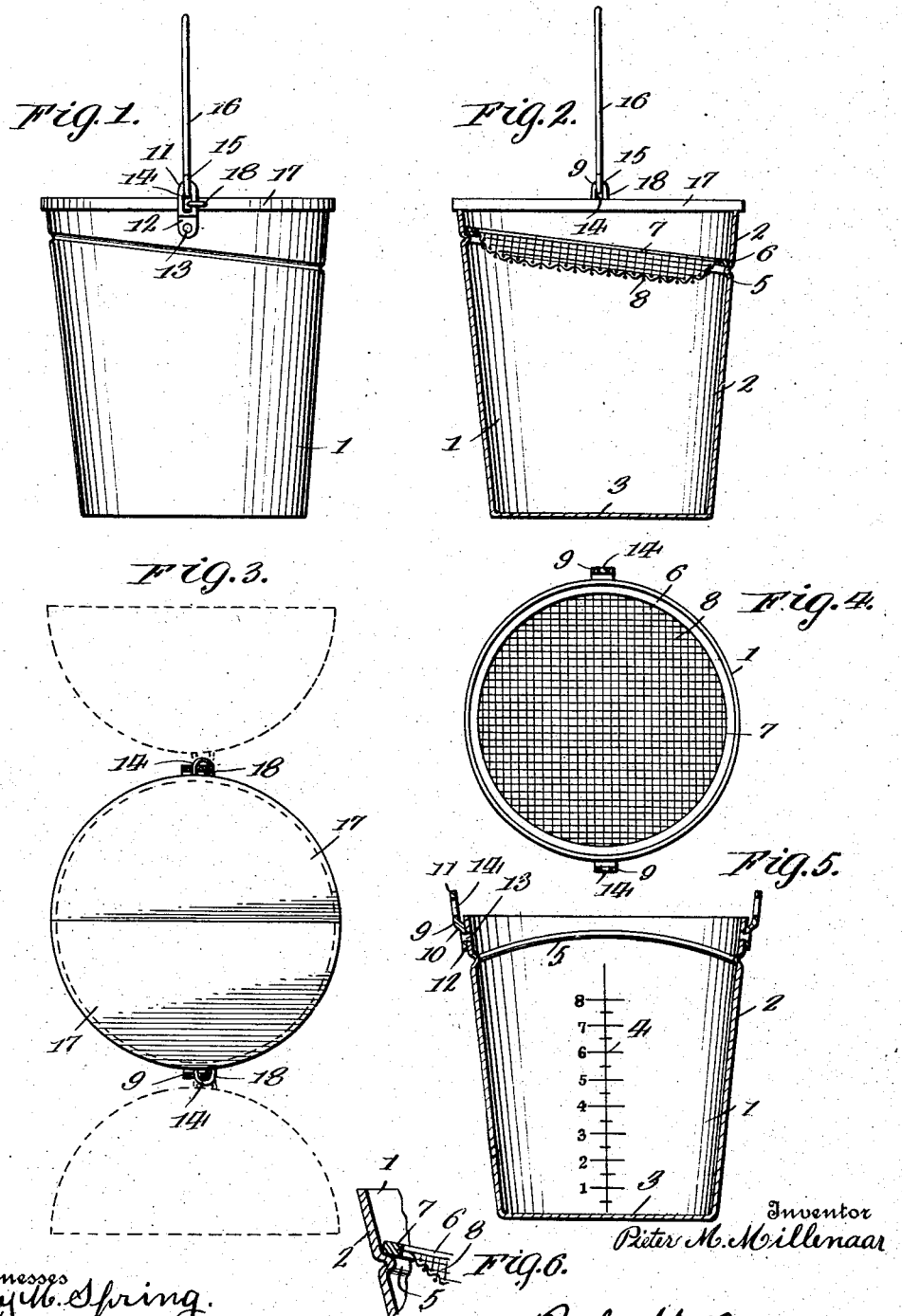

PIETER M. MILLENAAR, OF LUTHERVILLE, MARYLAND.

MILK-PAIL.

1,269,950.   Specification of Letters Patent.   Patented June 18, 1918.

Application filed July 14, 1914. Serial No. 850,982.

*To all whom it may concern:*

Be it known that I, PIETER M. MILLENAAR, a subject of the Queen of the Netherlands, residing at Lutherville, in the county of Baltimore and State of Maryland, have invented certain new and useful Improvements in Milk-Pails, of which the following is a specification.

My invention relates to milk pails.
The primary object of my invention resides in the provision of a sanitary milk pail having a novel straining means removably mounted therein for preventing the ingress of foreign substances while milking, the straining means being removable when it is desired to empty the contents of the pail.

Another object of my invention resides in the provision of a novel means for mounting the straining means within the pail for facilitating the straining of the milk and preventing the accumulation of foreign substances over the entire surface of the straining means.

A still further object of my invention resides in the provision of an improved closing means for the receptacle, the latter being movably mounted on the securing elements for the bail and when in position entirely closes the upper open end of the pail and prevents the entrance of foreign substances, the closing means being easily removed from position over the pail and disposed on the sides of the pail when it is desired to use the pail for milking purposes.
A still further object of my invention resides in the provision of a pail having novel means thereon for facilitating the exact amount of milk obtained from each cow.

A still further object of my invention resides in the provision of a milk pail that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

In the drawings:—

Figure 1 is a side elevational view of my invention;

Fig. 2 is a longitudinal sectional view of Fig. 1;

Fig. 3 is a top plan view of my invention showing the securing elements in section and the dotted lines showing the cover sections in an extended position preparatory to being placed upon the sides of the receptacle;

Fig. 4 is a top plan view of my invention with the cover sections removed;

Fig. 5 is a longitudinal sectional view of the pail proper showing especially the securing element secured thereto; and Fig. 6 is an enlarged fragmentary sectional view of a portion of the pail, showing a portion of the strainer in position on the ledge.

Referring more particularly to the drawings in which similar reference numerals designate like or corresponding parts throughout the different views, I provide a pail comprising a cylindrical body 1 formed preferably of Rochester tin, the body having the sides 2 tapering toward the bottom 3 and provided on its inner periphery with graduations 4 for facilitating the exact amount of milk obtained from each cow, and which body or pail is further provided on its inner periphery adjacent the upper edge thereof with an inwardly extending annular ledge 5, the latter being arranged at an angle to the bottom 3 as clearly shown in the drawings and formed by crimping the sides of the pail.

For the purpose of providing a sanitary pail and for straining the milk and thus preventing the ingress of foreign substances into the pail while milking, I have removably disposed on the ledge 5 a strainer element 6 which in this instance consists essentially of a ring 7, the latter being preferably rectangular in cross section and has a reticulated means preferably a curved piece of wire screening 8 embedded or otherwise secured intermediate the ends of the inner periphery of the ring 6 as clearly shown in Fig. 6 of the drawings and which strainer element 6 has the outer periphery thereof arranged in close relation with the sides 2 of the pail for preventing the ingress of foreign substances about the side edges thereof.

In order to carry the pail from place to place and at the same time provide a suitable closing means for the pail, I provide securing elements 9, the latter being secured at diametrically opposite points on the outer surface adjacent the upper edges of the sides of the pail and in this instance each consists essentially of a piece of sheet metal which is bent intermediate its ends as at 10 and has its respective extremities 11 and 12 arranged in parallel relation with each other, the inner extremity 12 being rigidly secured to the pail by means of a rivet 13, the outer extremities of each of the securing elements 9 are arranged in spaced relation with the sides 2 of the pail and provided with a longitudinally extending slot 14, the latter having secured therein the respective looped ends 15 of the bail 16. In order to close the pail, I provide a pair of preferably semicircular cover sections 17, the latter being also movably mounted in the slots 14 of the securing elements 9 by means of staples 18 which are first passed through the slots 14 and engaged at points intermediate the ends of the curved edges of the sections. The cover sections 17 when in closed position, as shown in Fig. 3, have their straight edges arranged in engagement with each other and are thus prevented from having undue movement on the pail. In order to remove the sections from position they are lifted upwardly and spring about the pivot point and placed in position with the sides 2 of the pail.

Although I have shown and described the preferred embodiment of my invention I desire to be understood that I am not limited to the exact details shown, however, I desire that great stress be laid upon the formation of the ledge 5 and the relation of the strainer element 6 therewith. Again attention is called to the fact of the provision of the sanitary closure for the pail for preventing the ingress of foreign substances into the interior of the pail when not in use, the cover sections in this instance providing the sanitary protection of the milk within the pail when the strainer element 6 is removed therefrom for cleaning purposes.

From the above description taken in connection with the accompanying drawings it can easily be seen that I have provided a device that is simple in construction containing but a few simple parts that can be cheaply manufactured and assembled and when assembled can be placed upon the market and sold at a minimum cost.

It will be understood that the above description and accompanying drawings comprehend only the general and preferred embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent, is:—

A receptacle including a cylindrical body, diametrically opposite securing elements mounted adjacent the upper edge thereof and having their upper ends offset and provided with slots and arranged in spaced relation with the outer surface of the body, a bail having the respective ends thereof pivotally mounted in the slots, semi-circular cover sections, eyes carried by the sections and movably mounted in the slots and arranged so that the sections can be lifted and swung from the body, and flanges depending from the outer edges of the sections and arranged to engage the outer surface of the body and also lie within the space between the securing elements and the outer surface of the body.

In testimony whereof I affix my signature in presence of two witnesses.

PIETER M. MILLENAAR.

Witnesses:
ALICE PERRIN,
PETER J. PERRIN.

Copies of this patent may be obtained for five cents each, by addressing the "Commissioner of Patents, Washington, D. C."